Dec. 2, 1924.
S. SORENSEN ET AL
1,517,761
COUPLING FOR ROTARY DRILL STEM SECTIONS
Filed April 6, 1920
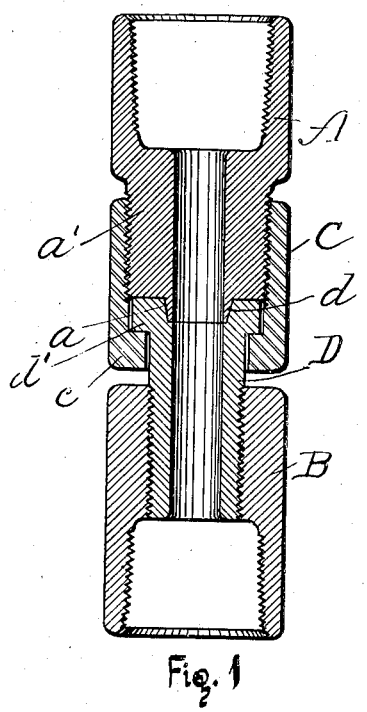
Fig. 1
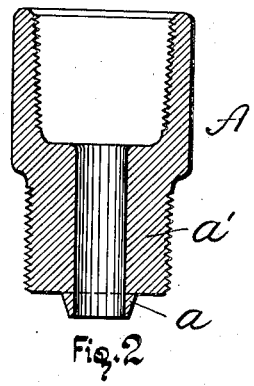
Fig. 2
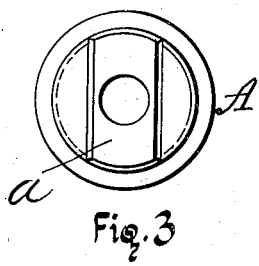
Fig. 3
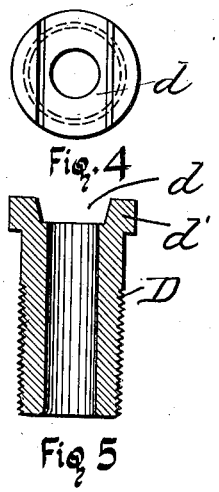
Fig. 4
Fig. 5
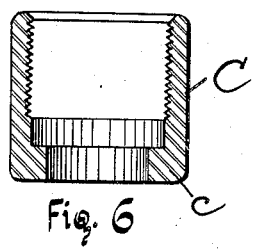
Fig. 6
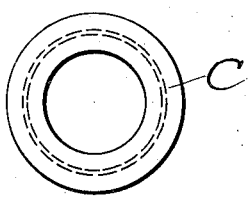
Fig. 7
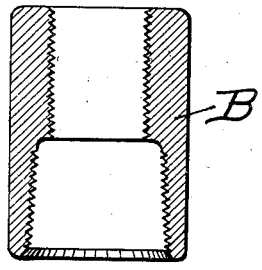
Fig. 8
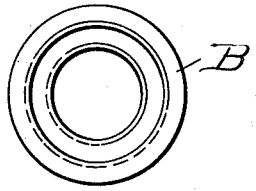
Fig. 9
Inventors
Sam Sorensen
Clarence E. Reed
Spear By Middleton, Donaldson & Hall
Attorneys Patented Dec. 2, 1924.

1,517,761

UNITED STATES PATENT OFFICE.

SAM SORENSEN AND CLARENCE E. REED, OF HOUSTON, TEXAS, ASSIGNORS, BY DIRECT AND MESNE ASSIGNMENTS, TO REED ROLLER BIT COMPANY, A CORPORATION.

COUPLING FOR ROTARY-DRILL-STEM SECTIONS.

Application filed April 6, 1920. Serial No. 371,752.

*To all whom it may concern:*

Be it known that we, SAM SORENSEN, a subject of the King of Denmark, and resident of Houston, in the county of Harris and State of Texas, and CLARENCE E. REED, a citizen of the United States, and resident of Houston, county of Harris, State of Texas, have invented certain new and useful Improvements in Couplings for Rotary-Drill-Stem Sections, of which the following is a specification.

The object of our invention is to provide a coupling for pipe sections of a rotary drill stem, of simple construction.

Another object is to provide a coupling which may be driven either right or left handed without becoming unscrewed.

Still another object of our invention is to provide a coupling, the joint of which will not tighten in operation, making disconnection simple when required.

In the drawing forming a part of this specification, like reference characters refer to like parts throughout the several views of which:

Figure 1 is a sectional view of one embodiment of the device as assembled;

Fig. 2 is a sectional view of upper end member A;

Fig. 3 is a bottom plan view of member A;
Fig. 4 is a top plan view of member D;
Fig. 5 is a sectional view of member D;
Fig. 6 is a sectional view of member C;
Fig. 7 is a bottom plan view of member C;
Fig. 8 is a sectional view of member B;
Fig. 9 is a bottom plan view of member B.

In Fig. 1, the end pieces A and B screw onto the pipe sections of the drill stem, through which the flushing fluid is to pass. The pieces C and D form the joint or coupling, between the pieces A, B to be made up or "broken", as the case may be, when the device is in use in the field. The upper part of collar C is threaded to screw on the lower end of A, which pulls the upper end of nipple D tightly against the lower end of piece A. The lower end of A has a tongue or projection, a, which fits into a recess or groove, d, in the upper part of nipple D. These two pieces are detailed in Figs. 2, 3, 4 and 5. When collar C is screwed tight on the piece A, the joint at the tongue and groove is completed and the tightly closed against leakage, the hole through the center, however, providing a passageway, for the flushing fluid. All the driving or rotating strains are transmitted through the tongue and groove connection, and the collar C, with its screw thread is entirely free from these strains. The screw threaded part of piece C sustains the weight of the stem and holds the tongue and groove connection in firm contact.

This arrangement of parts eliminates the necessity of having a right and a left hand threaded drill stem, which is now required by all operating companies. All threaded joints now in use tighten in operation and it is a difficult matter to "break" the joints when it is necessary to remove the drill stem from the well, and very frequently the threads are stripped. One of the advantages of the present joint is that the threads on C tighten sufficiently to make a good joint, but all the driving strains take place through the tongue and groove and the joint will not become tighter than it was when first made up by hand when the sections of the drill stem were screwed together, and it can be "broken" as easily as it is made up. The stem may be rotated in either direction and the advantage of non-tightening of the threaded parts of the joint will be present in either case.

It will be observed that the coupling in its over-all diameter at all points is about the same, that is to say, at the point where the tongue and groove connection with the surrounding threaded collar is located the diameter is no greater than at the socket members A, B. This result is arrived at by making the nipple D of small diameter as compared with the diameter of the socket members and also making the lower extension a' of the socket member, A, of reduced diameter so that the collar C may be made of a diameter no greater than that of the socket members and still be heavy enough to make a strong construction at this point, the collar, it will be noticed, is provided with an annular flange, c, taking under the annular flange d' of the nipple.

What we claim and desire to secure by Letters Patent is:

1. In combination in a coupling, two socket members, one having a nipple of reduced diameter screw threaded thereinto, and provided with a flange, and the other member having an external screw thread, a tongue and recess connection between the meeting ends of the nipple and the opposing socket member, and a collar held by the external screw thread of the socket member and engaging the flange to hold the members together, substantially as described.

2. In combination in a coupling, two socket members, one having an extension of reduced diameter in respect to its main portion, said extension being exteriorly screw threaded, the other member being of substantially the same diameter as the main body portion of the member first mentioned, a nipple of less diameter than and screw threaded into the second member and having a flange, said nipple and the opposing socket member having a tongue and recess connection between them to take the rotary strains, and a member screw threaded on the reduced extension and having a flange fitting under the flange of the nipple, said screw threaded member lying in the space between the large diameter portions of the coupling, said socket members and nipple having a bore for the passage of water.

3. In combination, two socket members, each having a bore for the passage of the water, a tongue and recess connection between the adjacent ends of said members to take the driving strains, said tongue and recess being coaxial with and extending about the bore of the members, and a screw threaded collar for drawing the parts together, substantially as described.

In testimony whereof, we affix our signatures.

SAM SORENSEN.
CLARENCE E. REED.